July 11, 1950
C. P. STRAND
2,515,140
SELECTIVE SOLVENT SEPARATION
OF UNSATURATED HYDROCARBONS
Filed Sept. 22, 1947
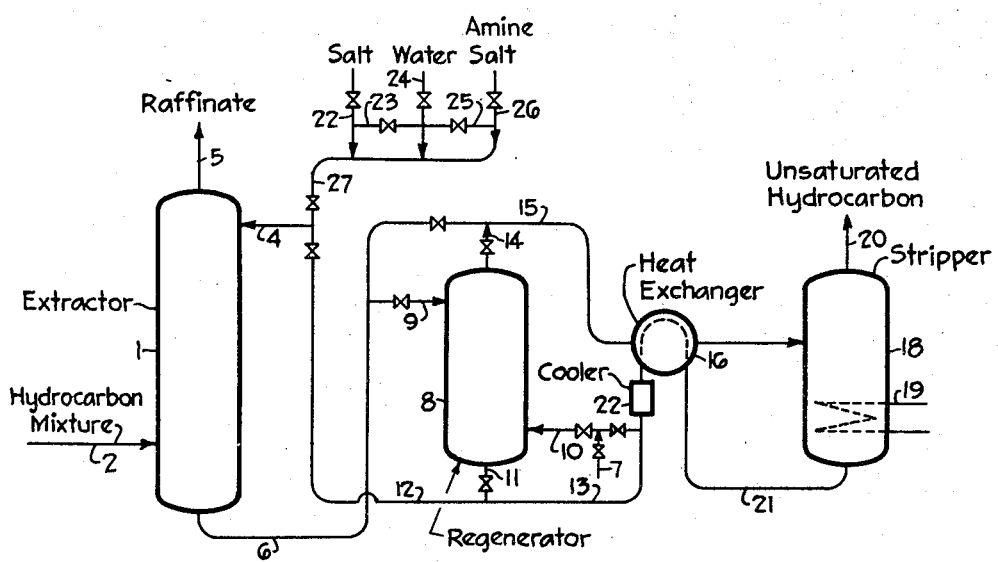
Inventor: Carl P. Strand
By his Attorney: James Todorovic Patented July 11, 1950

2,515,140

UNITED STATES PATENT OFFICE 2,515,140

SELECTIVE SOLVENT SEPARATION OF UNSATURATED HYDROCARBONS

Carl P. Strand, Berkeley, Calif., assignor to Shell Development Company, San Francisco, Calif., a corporation of Delaware Application September 22, 1947, Serial No. 775,482

20 Claims. (Cl. 260—677)

This invention relates to the separation and concentration of unsaturated from less unsaturated hydrocarbons, and is particularly applicable to the separation and concentration of olefins from fluid hydrocarbon mixtures.

Processes for separating olefins from hydrocarbon mixtures by contacting the mixtures with solutions of heavy metal salts capable of forming reversible complexes with said olefins, whereby said olefins are extracted by said solutions, have been described. The presence of a neutral water-soluble organic compound, such as ethylene glycol, has been stated to increase olefin absorption. However, the presence of the heretofore described solutizers, as has been found, does not increase absorption, while maintaining high selectivity, to the extent desired for commercial operations.

It is therefore an object of the present invention to provide an improved process for the separation of unsaturated hydrocarbons from fluid hydrocarbon mixtures containing them. Another object is to provide an improved process for separating olefins from olefinic cracked hydrocarbon mixtures. A still further object is to separate olefins, in substantially pure form, from other hydrocarbons. Still another object is to provide for the storage and transportation of normally gaseous unsaturated hydrocarbons. Further objects and advantages of the present invention will be readily apparent from the following description..

It has now been found that the addition of an amine salt to an aqueous solution of a water soluble silver salt, such as silver nitrate, greatly increases the absorption of unsaturated hydrocarbons therein, while the high selectivity of the absorbing solution for the unsaturated hydrocarbons over saturated hydrocarbons remains substantially unaffected. The present invention, therefore, provides an improved method of increasing the solubility of unsaturated hydrocarbons in aqueous silver salt solutions without loss of selectivity, as fully described hereinafter. Some doubt may exist as to the exact nature of the extraction of unsaturated hydrocarbons as herein described, i. e., whether the extraction is physical or due to the formation of a complex material between the unsaturated hydrocarbon and one or more components of the extracting solution, and it is not desired that the present invention be limited by any theory relative thereto. By "extraction," "absorption," and terms of similar import, as used herein, is meant the taking up of the unsaturated hydrocarbon by the solution in question independent of the mechanism thereof.

The present invention provides a process for the separation and concentration of unsaturated hydrocarbons from fluid mixtures containing them, which process comprises contacting said mixtures containing an unsaturated hydrocarbon with a solution of a water soluble silver salt in water and an amine salt, thereby absorbing or dissolving the unsaturated hydrocarbon in said solution and separating the resulting solution containing the unsaturated hydrocarbon from the remaining unabsorbed components of said mixture.

The present invention may be employed in connection with the separation and concentration of many different unsaturated hydrocarbons from a variety of fluid mixtures containing them. The term "fluid," as used herein, is meant to include both gases and liquids. For example, in one embodiment, the present invention may be employed for the separation of olefins such as ethylene, propylene and butylene from gaseous hydrocarbon mixtures, or such gaseous mixtures may be liquefied as by compression and the olefins separated from the liquefied mixture. Another embodiment of the present invention contemplates the separation of normally liquid unsaturated hydrocarbons, such as pentene, hexene, heptene, cyclopentene, cyclohexene, and the like, from liquid mixtures containing them. The process of the present invention may also be used to separate aromatic compounds containing an unsaturated aliphatic side chain from the corresponding saturated compound, the aromatic ring being considered to be saturated in the sense of the term as used herein and in the appended claims, or from other saturated compounds, such as the separation of styrene from ethyl benzene. Unsaturated hydrocarbons may also be separated from nonhydrocarbons, such as thiophene, furan, pyrrole, ethers, thioethers, their derivatives, and the like, in accordance with the present invention. A further application of the present invention is the separation and concentration of unsaturated from less unsaturated hydrocarbons, such as the separation of cyclopentadiene from cyclopentene, and the separation of acetylenic hydrocarbons from mixtures containing them. A still further application of the present invention is the treatment of mixtures of olefinic hydrocarbons to separate the components thereof, as hereinafter described.

The present invention is especially applicable to the separation of olefins from gasoline obtained by thermal or catalytic cracking of various petroleum oils such as crudes, residues, distillates or gases. While olefinic mixtures of hydrocarbons of various molecular weights may be treated in accordance with the present invention, as above indicated, mixtures of hydrocarbons having relatively small numbers of carbon atoms to the molecule, i. e., relatively low molecular weight hydrocarbons, such as for example hydrocarbons of from 2 to 8 carbon atoms, are especially suitable for employment therein. Thus, for example, the process of the present invention may be used to treat mixtures of hydrocarbons having from 2 to 8 carbon atoms containing olefins, which mixtures may be obtained by the vapor phase cracking of petroleum oils.

In accordance with the present invention, a hydrocarbon fluid containing one or more unsaturated hydrocarbons, such as olefins, is contacted with a solution containing a water soluble silver salt, water, and an amine salt. It has been found that such solutions absorb surprisingly large amounts of olefins. For example, aqueous silver nitrate solutions solutized with monobutylamine nitrate absorb up to about 45%, or more, of their own volume of 5 carbon atom olefins, whereas the same solutions solutized with ethylene glycol, for example, absorb only about 4% of their volume, while unsolutized aqueous solutions absorb only about 1 to 2% of their volume. Other olefins may be absorbed to an even greater extent, but the marked superiority of the solution solutized with an amine salt remains markedly predominant.

In carrying out the process of the present invention considerable latitude is permissible in the composition of the absorbing solution. Best results will be obtained, however, if the limits described below are observed. Broadly, the silver and amine salts may advantageously be present in quantities such that the weight ratio of silver salt to amine salt is from about 0.2 to about 8, with a water concentration of from about 7% to about 50% by weight, and in most instances excellent results are achieved when the said ratio is from about 0.5 to about 6 and the water concentration from about 16% to about 40%. The quantity of water present may be varied, but is preferably kept as small as is consistent with the solubility of the silver salt. For example, when silver nitrate and monobutylamine nitrate, preferred components of the absorbing solution of the present invention, are employed, the weight ratio of silver nitrate to the amine salt may advantageously be from about 0.3 to about 4, with a water concentration of from about 10% to about 40% by weight, and preferably the weight ratio is from about 0.5 to about 2 with a water concentration of from about 15% to about 36%. Specifically, with a weight ratio of silver nitrate to monobutylamine nitrate of 1, the quantity of water present may advantageously be about 28% by weight of the final solution. As the silver nitrate to amine salt ratio is decreased, the water concentration may be decreased, e. g., at a ratio of 0.5, the water concentration may advantageously be about 18% and high absorption of olefins obtained. Even though selectivity for olefins may decrease at relatively low water concentrations, in many instances the decrease is negligible. Conversely, if the silver nitrate to amine salt weight ratio be increased, the water concentration may usually advantageously be increased, so that at a ratio of 2, for example, the water concentration may advantageously be about 35% by weight.

In the preceding description of preferred compositions for the extracting solution of the present invention, silver nitrate is described as a preferred water soluble silver salt for use therein. As illustrative of other water soluble silver salts which may be employed may be mentioned the fluosilicate, perchlorate, fluoride, lactate, and acetate salts. Likewise, monobutylamine nitrate is described as a preferred amine salt for use in the present invention. By the term "amine salt," as used herein, is meant the product of combination of an amine, which may be primary, secondary or tertiary, with an acid, especially an inorganic acid, or with organic compounds which have been treated with an inorganic acid, such as sulfuric acid, while other organic acids may be employed in some instances. "Amine salt," as used herein, is also meant to include the quaternary ammonium salts, which may be described as the product of combination of a tertiary amine and an alkyl halide, such as methyl or ethyl fluoride. Such amine salts may be represented by the general formula: $[(amine)H]_nQ$, wherein $n$ is the valence of the acid radical Q, and H represents a hydrogen atom or an alkyl group. As illustrative of amine salts which may be employed may be mentioned the mono-, di-, and tri-ethyl, propyl, butyl, amyl, hexyl, heptyl and octyl amine nitrates, hydrofluorides, and fluosilicates, and homologues and analogues thereof. The amine may have two or three different alkyl groups attached to the nitrogen atom, which groups may be normal, secondary or tertiary. One or more of the above mentioned alkyl groups may be replaced by an aromatic radical, such as in phenylamine and diphenylamine. As illustrative of other amine salts which may be employed in the process of the present invention may be mentioned the amine salts of sulfonated organic compounds, such as methanesulfonic, 2-hydroxyethanesulfonic, and 3-hydroxypropanesulfonic, 2 - aminoethanesulfonic acids, and especially sulfonated aromatic compounds, such as monobutylamine phenolsulfonate, a preferred amine salt of the present invention, the mono-, di-, and tri-methyl, ethyl, propyl, amyl and hexyl homologues thereof, monobutylamine benzenesulfonate and homologues thereof, and the like. In general, for the purposes of the present invention, where two or more groups are attached to an aromatic nucleus, such as in monobutylamine phenylsulfonate, the groups may be in ortho, meta or para relation or mixtures thereof, and good results obtained therewith. By the term monobutylamine phenolsulfonate, as used herein, is meant to include all possible arrangements of the groups on the aromatic nucleus, and mixtures thereof. As illustrative of still other amine salts which may be employed in accordance with the present invention may be mentioned quaternary ammonium salts such as tetramethyl or tetraethyl ammonium nitrate or fluoride, dimethyldiethyl ammonium nitrate or fluoride, homologues and analogues thereof, pyridinium salts such as the methfluoride of pyridine, piperidinium salts such as the methnitrate of piperidine, morpholinium salts such as the methfluoride of morpholine, and the analogues, homologues, and suitable substitution products of these and related materials. Of course, as is well-known, the silver ion forms a precipitate with certain anions, and hence the presence of such materials in the process of the present invention is to be avoided.

The optimum solvent compositions for absorption of unsaturated hydrocarbons, in accordance with the present invention, when employing the various above mentioned amine salts, will depend largely upon the particular amine salt employed, and may be easily determined for any specific instance. Generally, the preferred compositions will follow the above considerations, where monobutylamine nitrate and silver nitrate were employed as illustrative. For example, when monobutylamine phenolsulfonate is employed as the amine salt and silver nitrate as the water soluble silver salt, the silver nitrate and amine salt may advantageously be employed in quantities such that they are present in weight ratio of silver nitrate to amine salt of from about 0.3 to about 7, at which ratios the water concentration may advantageously be from about 20% to about 40% by weight of the solution, smaller amounts of water being employed at the lower ratios, and preferably the silver and amine salts are employed in weight ratios of from about 0.5 to about 6, with a water concentration of from about 22% to about 30% by weight. Smaller or greater ratios may be employed and good results obtained therewith. Specifically, for example, at a weight ratio of silver nitrate to monobutylamine phenolsulfonate of 1, the water concentration may advantageously be about 23%, whereas at a ratio of 4 the water concentration may advantageously be about 27%, or higher.

The amine salts employed in the present invention may be prepared by methods known heretofore, such as by reacting the appropriate amine and acid to form the desired salt, and removing any water, as by vacuum distillation, when necessary. The presence of relatively small amounts of free acid is not undesirable in most instances, and frequently serves to increase the stability of the absorbing solution. The present amine salts are miscible with or soluble in aqueous silver salt solutions, and hence the absorbing solutions of the present invention are generally homogeneous.

Any suitable type of apparatus may be employed in carrying out the process of the present invention for effecting the desired separation, which may be adapted to batch, intermittent, or continuous operation. After contacting the fluid hydrocarbon with the absorbing solution, the raffinate and extract phases are separated, and the unsaturated hydrocarbon recovered from the extract. The unsaturated hydrocarbon recovery and regeneration of the extracting solution are conveniently accomplished in one operation, such as by heating or reducing the pressure, or both, in order to distill off the absorbed unsaturated hydrocarbon, or by extraction of the unsaturated hydrocarbon with a second solvent which is substantially immiscible in the extracting solvent, but which dissolves large amounts of the unsaturated hydrocarbon and preferably is miscible therewith in all proportions, and which may be separated from the unsaturated hydrocarbon preferably by distillation. Suitable second solvents, for example, are the relatively high boiling paraffin hydrocarbons, such as n-octane, which may be employed for olefin extraction in most instances, but of course other solvents, such as n-nonane, n-decane, n-undecane, and the like, may be employed. In general, the second solvent should be selected so that it may readily be separated from the unsaturated hydrocarbon, i. e., if the separation is to be accomplished by distillation, the second solvent should be selected so that its boiling point is substantially different from that of the unsaturated hydrocarbon.

The optimum temperature to be employed in the extraction step varies with the particular compound to be treated, and may range up to about 150° F. or more, but in most instances temperatures below 80° F., and particularly those in the range of from about 32 to about 80° F. are suitable in most instances. In general, atmospheric pressures are contemplated for use in the unsaturated hydrocarbon absorption step of the process of the present invention, especially where the fluid hydrocarbon being treated is a liquid under the conditions of the process, but sub- or super-atmospheric pressures may be employed where desirable.

As illustrative of a preferred embodiment of the present invention, a mixture of olefins and paraffins obtained from the thermal or catalytic cracking of a petroleum oil, wherein preferably the hydrocarbons contain from about 2 to about 8 carbon atoms, is contacted with an aqueous silver nitrate solution solutized with an amine salt, such as monobutylamine nitrate or monobutylamine phenylsulfonate, containing silver nitrate and amine salt in quantities such that the weight ratio of silver nitrate to amine salt is from about 0.2 to about 8, and preferably from about 0.4 to about 3, and containing from about 7% to about 50% by weight of water, and preferably from about 16% to about 40% by weight of water. The volume of hydrocarbon per volume of extracting solution employed may be varied considerably, the optimum value depending largely on the composition of the hydrocarbon mixture and the various operating conditions, but in most instances the volume ratio of hydrocarbon to extracting solution may advantageously be from about 0.1 to about 1.0. The temperature of the extraction step is preferably within the range of from about 32 to about 80° F., but the increase of absorption with decrease in temperature is not marked, and hence the economies of the process will usually dictate the use of ambient or atmospheric temperature. After contacting the hydrocarbon and extracting solution, whether the process be of batch, intermittent or continuous type, the raffinate and extract phases are separated, the olefins recovered from the extract phase, preferably by distillation or solvent extraction, and the regenerated extracting solution recycled in the process.

The present invention may be better understood from a consideration of the accompanying schematic flow diagram which represents an embodiment thereof wherein a fluid hydrocarbon mixture containing the unsaturated hydrocarbon(s) to be separated is introduced into an extractor 1 (provided for intimately contacting counterflowing immiscible fluids) via line 2, while the extracting solution (solvent) is introduced into said extractor via line 4. The hydrocarbon(s) mixture passes upward in countercurrent flow to the extracting solution, with the raffinate leaving the extractor via line 5. The first extract, which comprises the extracting solution (solvent) containing the extracted unsaturated hydrocarbon(s), passes out of the extractor via line 6 and, where the unsaturated hydrocarbon(s) is stripped by a second solvent therefor, the first extract is passed into regenerator 8 via line 9. The second solvent, which is substantially immiscible with the extracting solution, is introduced into said regenerator via line 10. The extracting solution of the first extract, flowing countercurrently to the second solvent, is stripped of the unsaturated hydrocarbon(s), then passes out of the regenerator via line 11, and is recycled to the extractor via lines 11, 12 and 4. The second or stripping solvent containing the unsaturated hydrocarbon(s) passes from the regenerator via lines 14 and 15, through heat exchanges 16, and into a suitable stripper 18 fitted with heating means 19, such as a steam coil or the like. The unsaturated hydrocarbon(s) is stripped from the second solvent and passes from the stripper via line 20 and may be stored or may be otherwise treated, e. g., reacted to form derivatives thereof. The regenerated second solvent is recycled from the stripper into the regenerator via line 21, heat exchanger 16, cooler 22 if desired (which may be operated by any convenient means, such as by cooling with water) and line 10. When necessary or desirable, additional second solvent may be introduced into the system via lines 7 and 10.

When a second solvent is not employed, and the unsaturated hydrocarbon(s) is stripped from the extracting solution by heat, the regenerator 8 is by-passed, the extracting solution passing from the extractor 1 via lines 6 and 15, through heat exchanger 16, and into stripper 18, where the unsaturated hydrocarbon(s) is stripped by heat, and leaves the stripper via line 20. The regenerated extracting solution is recycled from the stripper to the extractor via line 21, heat exchanger 16, cooler 22, and lines 13, 12 and 4. When it is necessary or desired to adjust or change the composition of the extracting solution, silver salt, water and the amine salt may jointly or individually be introduced into the extracting solution via lines 22, 23, 24, 25, 26 and 27.

Various modifications in the above described apparatus and process may of course be employed, such as recycling the raffinate through at least a portion of the extractor in order to obtain an especially pure raffinate. For purposes of simplicity, pumps, temperature controls, control means, additional heat exchangers and the like, the proper placement of which is evident to those skilled in the art, have been largely omitted.

By carrying out the process of the present invention, as herein described, surprisingly large amounts of olefin are absorbed per unit of solvent, which olefin may be easily recovered in substantially pure form. The extracting solution, after removal of the olefin, may be recycled in the process, and is surprisingly stable, only small losses of silver and amine salt occurring which, of course, may be recovered.

The main object of the present invention, the separation of unsaturated from less unsaturated hydrocarbons, has been described. It has also been found that the present invention may be employed to separate various classes of olefins. Thus, cyclic olefins are selectively absorbed from non-cyclic olefins, and olefins having the double bond in the alpha position are selectively absorbed from those wherein the double bond is in a different position, such as the beta position, while methyl and higher alkyl substituents on carbon atoms attached to the olefinic bond somewhat reduces selectivity. For example, cyclopentene is absorbed selectively over straight chain 5 carbon atom olefins, 5 carbon atom olefins having the double bond in the alpha position are absorbed selectively over those with the double bond in the beta position, while a methyl substituent on a carbon atom involved in the olefinic bond somewhat decreases selectivity.

Various modifications of the present invention, as herein described, may be employed, such as recycling the extracted unsaturated hydrocarbon through at least a part of the extraction zone in order to obtain an especially purified product. This modification is especially desirable where a more unsaturated or a preferentially absorbed unsaturated hydrocarbon is separated from a less unsaturated or a less preferentially absorbed unsaturated hydrocarbon, since, although the more unsaturated or preferentially absorbed hydrocarbon is preferentially extracted, some of the less unsaturated or less preferentially absorbed unsaturated hydrocarbon will be also extracted, and recycling is desirable in order to obtain better separation and substantial purity of the product. These and other modifications are within the scope of the present invention.

A further important embodiment of the present invention is to provide for the storage and transportation of unsaturated hydrocarbons. Since the lower unsaturated hydrocarbons are gases at ordinary temperatures, and expand with increasing temperatures, it has been customary to employ strong and necessarily heavy containers for their storage and transportation. Due to the great solubility of unsaturated hydrocarbons in solutions of silver salts in water and amine salts, as herein described, such unsaturated hydrocarbons may conveniently be stored and transported while dissolved in the said solutions. For example, a solution of silver nitrate in monobutylamine nitrate or monobutylamine phenolsulfonate and water may be placed in a suitable container, and a lower olefin, i. e., an olefin that is gaseous at ordinary temperatures and pressures, is introduced therein. It is usually advantageous to store the gas at a somewhat elevated pressure, since more will be dissolved thereby. The compositions of the absorbing solutions may be the same as those used for the separation of unsaturated hydrocarbons as herein described. Pressures up to about 10 atmospheres generally are suitable, though higher pressures may be employed if desired. When it is desired to recover the gas, it may be easily removed from the solution by heating and/or reducing the pressure, or by extracting with a solvent therefor which is immiscible in the solution. Solutions of unsaturated hydrocarbons in the solvents of the present invention, therefore, constitute new and useful compositions of matter.

The following examples illustrate the present invention, which is not to be considered as limited thereby:

EXAMPLE I

Olefins from a mixture of 5 carbon atom olefins and paraffins were absorbed in solutions of silver nitrate, water and monobutylamine nitrate, under comparable conditions, all extractions being made at 60° F. After extraction the extract phase was desorbed by heating, thereby removing the absorbed olefin. The compositions of the absorbing solutions and results obtained are presented in Table I:

Table I

| Solvent Composition, Weight Per Cent | | | | Olefin Absorption per cent by volume of solvent | Per Cent Free HNO$_3$ lost per extraction | Per cent AgNO$_3$ lost Extraction and Desorption |
|---|---|---|---|---|---|---|
| AgNO$_3$ | H$_2$O | MBAN [1] | Free HNO$_3$ | | | |
| 56 | 44 | | | 1.8 | | 0.011 |
| 22.8 | 16.8 | 56.0 | 4.4 | 7.1 | None | None |
| 35.7 | 25.5 | 36.3 | 2.5 | 5.7 | None | None |

[1] Monobutylamine nitrate.

These data show the large increase of absorption of olefins in aqueous silver nitrate solutions containing monobutylamine nitrate over the unsolutized aqueous silver salt solution, and the surprising stability of the absorbing solutions.

EXAMPLE II

Pentene-1 was extracted from mixtures thereof with isopentane by contacting the mixtures with solutions of silver nitrate, monobutylamine phenolsulfonate, and water of varying compositions. The weight ratio of silver nitrate to monobutylamine phenolsulfonate was varied from about 0.3 to about 5.7, while the water content was varied from about 25% to about 50% by weight of the absorbing solution, and the hydrocarbon mixture was varied from about 30 to 70 to about 90 to 10% by volume pentene-1 to isopentane. Olefin absorption was generally very high, and the purity of the extracted olefin, always above about 95%, was usually 100%. For example, with a weight ratio of silver nitrate to monobutylamine phenolsulfonate of 0.32, 35.3% water, and pentene-1 and isopentane present in volume ratio of pentene-1 to isopentane of 1.52, olefin absorption was 7.5% by volume of the solution and was 96% pure, the extraction being made at 60° F. With a weight ratio of silver nitrate to the amine salt of 5.67 and a water content of 30.5%, other conditions being as above, olefin absorption was 15.7% by volume of the absorbing solution, and was 100% pure. Under similar conditions, except with pentene-1 and isopentane present in volume ratio of 9.5, olefin absorption was 45.8% by volume of the absorbing solution and was 98% pure.

The effect of temperature on the extraction, though noticeable, is not marked. For example, extractions made under identical conditions except for temperature gave, at 50, 60 and 80° F., absorptions of 18.2, 15.7 and 11.6% by volume of the absorbing solution, with purities of 98.5, 100 and 100%, respectively.

This example demonstrates the high olefin absorption and purity thereof obtained by the present invention, that wide ranges of composition of the absorbing solutions are permissible, and that the process is not significantly adversely affected by temperature changes.

EXAMPLE III

Mixtures of pentene-1 and isopentane were contacted with silver nitrate, water and monobutylamine nitrate. A small amount of free nitric acid was present in the solutions. The solution compositions, extraction conditions and results obtained are shown in Table II. In each case, sufficient hydrocarbon was employed so that some olefin remained in the raffinate, and the amount of olefin extracted per indicated quantity of olefin remaining in the raffinate is shown.

Table II

| Solvent Composition | | | Olefin absorption, volume per cent of solvent at indicated olefin concentration in raffinate (Volume per cent) | | |
|---|---|---|---|---|---|
| AgNO$_3$: MBAN [1] Weight Ratio | Weight Per Cent | Temperature, °F. | 10 | 50 | 70 |
| 0.38 | 12.5 | 50 | 2.7 | 12.7 | 16.6 |
| 0.38 | 12.5 | 60 | 2.5 | 11.8 | 15.6 |
| 0.38 | 12.5 | 80 | 2.0 | 9.9 | 13.6 |
| 1.08 | 28.2 | 50 | 4.7 | 20.8 | 26.4 |
| 1.08 | 28.2 | 60 | 4.2 | 18.6 | 24.0 |
| 1.08 | 28.2 | 80 | 3.5 | 16.1 | 20.6 |
| 2.98 | 35.9 | 50 | 3.2 | 20.0 | 31.5 |
| 2.98 | 35.9 | 60 | 2.8 | 15.9 | 25.0 |
| 2.98 | 35.9 | 80 | 2.2 | 11.5 | 17.2 |

[1] Monobutylamine nitrate.

EXAMPLE IV

A gasoline cut of a hydrocarbon distillate containing various olefins was contacted with a solvent containing 33% by weight of silver nitrate, 35.8% by weight monobutylamine nitrate, and 31.2% by weight water. The raffinate from this extraction was re-extracted and the two extracts and second raffinate analyzed. The extractions were made at 60° F. and atmospheric pressure. The olefinic components of the gasoline and results obtained are shown in Table III:

Table III

| Component | 1st Extraction | | | 2nd Extraction | | | |
|---|---|---|---|---|---|---|---|
| | Charge, per cent by volume | Extract, per cent by volume | Extraction, per cent | Charge, per cent by volume | Extract, per cent by volume | Extraction, per cent | Raffinate, per cent by vol. |
| 4 Carbon olefins | 3.5 | 11.6 | 88 | 0.5 | 2.2 | 60 | 0.2 |
| 3-Methylbutene-1 | 0.7 | 1.3 | 50 | 0.5 | 1.8 | 50 | 0.1 |
| Pentene-1 | 3.6 | 11.5 | 85 | 0.7 | 3.9 | 70 | 0.2 |
| 2-Methylbutene-1 | 5.5 | 15.8 | 76 | 1.7 | 4.8 | 35 | 1.3 |
| Pentene-2 | 15.8 | 31.8 | 53 | 10.3 | 33.5 | 43 | 6.8 |
| 2-methylbutene-2 | 9.1 | 16.0 | 45 | 6.9 | 25.5 | 48 | 4.0 |
| Cyclopentene | 0.7 | 2.7 | 100 | 0.0 | 0.0 | | 0.0 |
| 6 Carbon olefins | 1.65 | 2.9 | 45 | 1.2 | 4.5 | 50 | 0.7 |
| Saturates | 58.7 | 6.4 | 2.8 | 78.2 | 23.8 | 4 | 86.7 |

The data demonstrate the feasibility of the process of the present invention for the separation of various olefins and various classes of olefins.

The invention claimed is:

1. A process for the separation of olefins from paraffins which comprises contacting a fluid hydrocarbon mixture containing olefinic and paraffinic hydrocarbons with an aqueous solution of silver nitrate and monobutylamine nitrate wherein the weight ratio of silver nitrate to monobutylamine nitrate is from about 0.5 to about 2, and wherein the water concentration is from about 15% to about 36% by weight.

2. A process for the separation of olefins from paraffins which comprises contacting a fluid hydrocarbon mixture containing olefinic and paraffinic hydrocarbons with an aqueous solution of silver nitrate and monobutylamine nitrate wherein the weight ratio of silver nitrate to monobutylamine nitrate is from about 0.3 to about 4.0 and wherein the water concentration is from about 10% to about 40% by weight.

3. A process for the separation of olefins from paraffins which comprises contacting a fluid hydrocarbon mixture containing olefinic and paraffinic hydrocarbons with an aqueous solution of silver nitrate and an alkyl amine nitrate wherein the weight ratio of silver nitrate to the alkyl amine nitrate is from about 0.3 to about 4, and wherein the water concentration is from about 10% to about 40% by weight.

4. A process for the separation of olefins from paraffins which comprises contacting a fluid hydrocarbon mixture containing olefinic and paraffinic hydrocarbons with an aqueous solution of silver nitrate and an organic amine nitrate wherein the weight ratio of silver nitrate to the amine nitrate is from about 0.3 to about 4, and wherein the water concentration is from about 10% to about 40% by weight.

5. A process for the separation of olefins from paraffins which comprises contacting a fluid hydrocarbon mixture containing olefinic and paraffinic hydrocarbons with an aqueous solution of silver nitrate and an organic amine nitrate salt, wherein the weight ratio of silver nitrate to said amine nitrate salt is from about 0.2 to about 8.

6. A process for the separation of olefins from paraffins which comprises contacting a fluid hydrocarbon mixture containing olefinic and paraffinic hydrocarbons with an aqueous solution of silver nitrate and an organic amine nitrate salt.

7. A process for the separation of olefins from paraffins which comprises contacting a fluid hydrocarbon mixture containing olefinic and paraffinic hydrocarbons with an aqueous solution of silver nitrate and monobutylamine phenol sulfonate wherein the weight ratio of silver nitrate to monobutylamine phenolsulfonate is from about 0.5 to about 6, and wherein the water concentration is from about 22% to about 30% by weight.

8. A process for the separation of olefins from paraffins which comprises contacting a fluid hydrocarbon mixture containing olefinic and paraffinic hydrocarbons with an aqueous solution of silver nitrate and monobutylamine phenol sulfonate wherein the weight ratio of silver nitrate to monobutylamine phenolsulfonate is from about 0.3 to about 7, and wherein the water concentration is from about 20% to about 40% by weight.

9. A process for the separation of olefins from paraffins which comprises contacting a fluid hydrocarbon mixture containing olefinic and paraffinic hydrocarbons with an aqueous solution of silver nitrate and an organic amine salt of an aromatic sulfonic acid wherein the weight ratio of silver nitrate to the amine salt is from about 0.5 to about 6, and wherein the water concentration is from about 22% to about 30% by weight.

10. A process for the separation of olefins from paraffins which comprises contacting a fluid hydrocarbon mixture containing olefinic and paraffinic hydrocarbons with an aqueous solution of silver nitrate and an organic amine salt of an organic sulfonic acid wherein the weight ratio of silver nitrate to the amine salt is from about 0.5 to about 6, and wherein the water concentration is from about 22% to about 30% by weight.

11. A process for the separation of olefins from paraffins which comprises contacting a fluid hydrocarbon mixture containing olefinic and paraffinic hydrocarbons with an aqueous solution of silver nitrate and an organic amine salt of an organic sulfonic acid wherein the weight ratio of silver intrate to the amine salt is from about 0.5 to about 6.

12. A process for the separation of olefins from paraffins which comprises contacting a fluid hydrocarbon mixture containing olefinic and paraffinic hydrocarbons with an aqueous solution of silver nitrate and an organic amine salt of an organic sulfonic acid wherein the weight ratio of silver nitrate to the amine salt is from about 0.2 to about 8.

13. A process for the separation of olefins from paraffins which comprises contacting a fluid hydrocarbon mixture containing olefinic and paraffinic hydrocarbons with an aqueous solution of silver nitrate and an organic amine salt of an inorganic acid, including organo-substituted inorganic acids, the silver salt of which inorganic acid is water-soluble, the weight ratio of the silver nitrate to said amine salt being from about 0.2 to about 8.

14. A process for the separation of olefins from paraffins which comprises contacting a fluid hydrocarbon mixture containing olefinic and paraffinic hydrocarbons with an aqueous solution of a silver salt selected from the group consisting of silver nitrate, silver fluosilicate, silver perchlorate, silver fluoride, silver lactate and silver acetate and an organic amine salt of an inorganic acid, including organo-substituted inorganic acids, the silver salt of which inorganic acid is water-soluble, the weight ratio of the silver salt to said amine salt in said solution being from about 0.2 to about 8.

15. A process for the separation of unsaturated hydrocarbons from mixtures thereof with less unsaturated hydrocarbons which comprises contacting a hydrocarbon mixture containing said unsaturated and less unsaturated hydrocarbons with an aqueous solution of a silver salt selected from the group consisting of silver nitrate, silver fluosilicate, silver perchlorate, silver fluoride, silver lactate and silver acetate and an organic amine salt of an inorganic acid, including organo-substituted inorganic acids, the silver salt of which inorganic acid is water-soluble, the weight ratio of the silver salt to said amine salt in said solution being from about 0.2 to about 8.

16. A process for the separation of an unsaturated hydrocarbon from a mixture thereof with other hydrocarbons which comprises contacting said mixture with an aqueous solution of a water-soluble silver salt and an organic amine salt of an inorganic acid, including organo-substituted inorganic acids, the silver salt of which inorganic acid is water-soluble, the weight ratio of the silver salt to said amine salt in said solution being from about 0.2 to about 8.

17. A process for the separation of olefins from paraffins which comprises contacting a fluid hydrocarbon mixture containing olefinic and paraffinic hydrocarbons with an acidic aqueous solution of silver nitrate, monobutylamine nitrate and free nitric acid wherein the weight ratio of silver nitrate to monobutylamine nitrate is from about 0.3 to about 4.0, the water concentration is from about 10% to about 40% by weight and the free nitric acid is present in a small minor amount of from about 2.5% to about 4.4% by weight of the solution.

18. A process for the separation of olefins from paraffins which comprises contacting a fluid hydrocarbon mixture containing olefinic and paraffinic hydrocarbons with an acidic aqueous solution of silver nitrate, an organic amine nitrate salt and a minor proportion of free nitric acid.

19. A process for the separation of olefins from paraffins which comprises contacting a fluid hydrocarbon mixture containing olefinic and paraffinic hydrocarbons with an aqueous solution of silver nitrate and an organic amine phenol sulfonate wherein the weight ratio of silver nitrate to organic amine phenol sulfonate is from about 0.3 to about 7, and wherein the water concentration is from about 20% to about 40% by weight.

20. A process for the separation of olefins from paraffins which comprises contacting a fluid hydrocarbon mixture containing olefinic and paraffinic hydrocarbons with an aqueous solution of silver nitrate and an organic amine salt selected from the group consisting of an organic amine nitrate and an organic amine phenol sulfonate wherein the weight ratio of silver nitrate to organic amine salt is from about 0.2 to about 8.

CARL P. STRAND.

REFERENCES CITED

The following references are of record in the file of this patent:

UNITED STATES PATENTS

| Number | Name | Date |
|---|---|---|
| 2,005,500 | Joshua et al. | June 18, 1935 |
| 2,235,119 | Robey | Mar. 18, 1941 |
| 2,376,239 | Evans et al. | May 15, 1945 |
| 2,395,957 | Breuer | Mar. 5, 1946 |
| 2,451,376 | Bernard et al. | Oct. 12, 1948 |
| 2,463,482 | Francis | Mar. 1, 1949 |